(12) United States Patent
Haldimann

(10) Patent No.: US 6,206,179 B1
(45) Date of Patent: Mar. 27, 2001

(54) CHAIN CONVEYOR

(75) Inventor: Hans-Rudolf Haldimann, Lugano (CH)

(73) Assignee: Gilgen Fordersysteme AG, Oberwangen (CH)

( * ) Notice: Subject to any disclaimer, the term of this patent is extended or adjusted under 35 U.S.C. 154(b) by 0 days.

(21) Appl. No.: 09/101,256

(22) PCT Filed: Oct. 10, 1997

(86) PCT No.: PCT/CH97/00385

§ 371 Date: Jul. 6, 1998

§ 102(e) Date: Jul. 6, 1998

(87) PCT Pub. No.: WO98/23507

PCT Pub. Date: Jun. 4, 1998

(30) Foreign Application Priority Data

Nov. 27, 1996 (CH) .................................................. 2915/96

(51) Int. Cl.[7] .................................................. B65G 25/04
(52) U.S. Cl. .................................. 198/750.1; 198/750.4; 198/850; 198/817; 198/853
(58) Field of Search ................................. 198/853, 750.1, 198/750.4, 850, 817; 193/38, 37, 2 R, 35 A, 3, 4, 25 FT; 414/267, 276, 286; 474/202, 237, 152, DIG. 148; 464/49; 59/78

(56) References Cited

U.S. PATENT DOCUMENTS 3,708,059 * 1/1973 Ackermann .......................... 198/841
4,515,578 * 5/1985 Burger ................................. 474/231
5,538,384   7/1996 Haldimann .

FOREIGN PATENT DOCUMENTS 495894   11/1938 (GB) .
8911602  11/1989 (WO) .

* cited by examiner

*Primary Examiner*—Christopher P. Ellis
*Assistant Examiner*—Kenneth W Bower
(74) *Attorney, Agent, or Firm*—Tarolli, Sundheim, Covell, Tummino & Szabo L.L.P.

(57) ABSTRACT

A chain conveyor comprises a roller chain (6) [should read "8"] and a supporting rail (5) for vertically supporting the roller chain (6) [should read "8"]. The roller chain (6) [should read "8"] consists of a plurality of supporting rollers (3) that are interconnected by means of chain links (1). The chain links are of U-shaped design inasmuch as they comprise two legs (11, 12) and a base portion (10) located therebetween. The mean length (L) of the base portion (10) corresponds at least approximately to the distance (A) of the axes of two adjacent supporting rollers (3). The front faces of adjacent base portions of adjacent chain links are correspondingly designed and act as stops, inasmuch as they limit the mutual rotating movement of adjacent chain links, exceeding a predetermined angle, in such a way that the roller chain can transmit thrust forces. For laterally guiding the roller chain, discrete guiding elements (2) are provided which are inserted into the shafts that interconnect the chain links in an articulated manner.

16 Claims, 3 Drawing Sheets

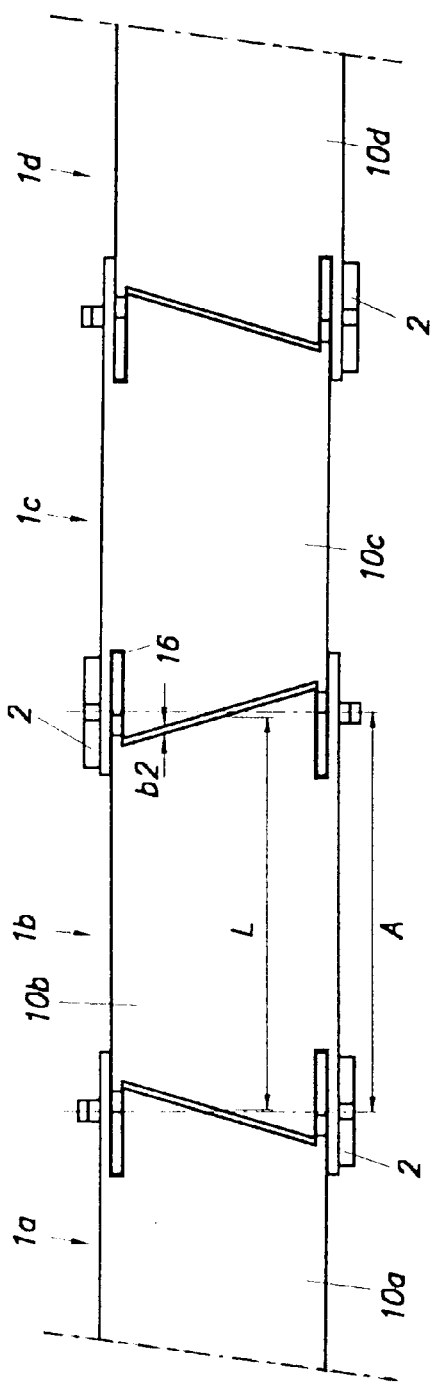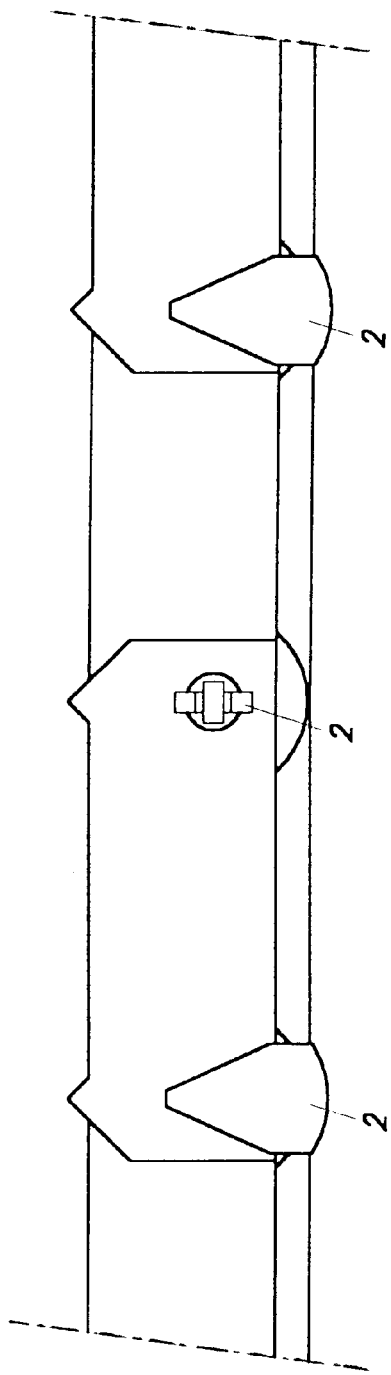

CHAIN CONVEYOR

FIELD OF INVENTION

The invention refers to a chain conveyor comprising a roller chain and a supporting rail for vertically supporting the roller chain. The roller chain comprises a plurality of supporting rollers which are interconnected by means of chain links.

The chain conveyors discussed herein are used in general in storage shelves of rack storage facilities where they serve as a conveying means for the goods to be stored. The conveying means is usually looped over two deflections to form an endless conveying means, whereby there is provided, as the real conveying means, a conveyor chain provided with rollers. In order to save costs and weight, however, not the entire circulating conveying means is constituted as chain, but only about half of it, while the other half is constituted by a strap.

As a support for the goods to be stored, in most cases pallets are used. Upon storing the goods, the latter ones are laid onto the conveyor chain and, mostly by means of a fork lift truck, pushed into the storage rack. If the need arises, the goods are pulled out again by this fork lift truck.

PRIOR ART

The document WO 94/00370 entitled "Pallet-Support Rail and Slide-in Pallet-Storage Unit with Pallet-Support Rails and Pallet-Conveyor Track" discloses a chain conveyor of the generic concept discussed herein. This conveyor is provided with a roller chain, the supporting rollers thereof being connected to each other on both sides by means of a pair of lateral link plates, whereby each second link of the chain is designed as supporting strap member. The lateral link plates project downwards to such an extent that they can laterally guide the upper run of the roller chain along the rail, whereby, for this purpose, the rail is smaller in its width than the mutual distance of the two link plates of a pair. In its lower portion, the rail made of aluminum comprises a return channel in which the lower run of the roller chain is received, guided and supported.

The problems in connection with the chain conveyor discussed above consist in that the lateral link plates of the roller chain have to take both tractive forces as well as guiding forces. Thus, the lateral link plates cannot be made continuously of a material which has good self-lubricating properties, like PTFE, but they have to be manufactured, at least partially, of a high-strength material, for example steel. This design results in the disadvantage that the frictional values between roller chain and guiding rail are relatively high. This is also particularly true for the lower chain run received in the return channel because here additionally the intrinsic weight of the roller chain has to be supported by the lateral link plates. Due to the high frictional values arising between roller chain and supporting rail, the constructional length of a chain conveyor with such a design is limited. Moreover, it has shown that the frictional resistance is additionally increased by the tractive load of the lateral link plates simultaneously designed as guiding means.

Further problems in connection with a chain conveyor as discussed herein before consist in the fact that the chains used hereby can take only tractive forces. As soon as thrust forces act on the chain, what is always the case upon loading of goods, the danger exists that the chain folds by the mutual rotation of particular chain links that are subjected to thrust forces.

Particularly that chain portion which is situated between the pallet to be pushed in and the goods already stored is subjected to thrust forces to a high extent. The pallet to be pushed in exerts a tractive force onto the chain portion situated behind that pallet and guided around the front deflection. Since such deflections have a very small diameter due to the limited available space, they have a bad efficiency and are not suited for high tractive forces. The tractive force in the chain deflected around the deflection is transmitted via the elastic strap to the rear deflection which further decreases the efficiency, whereby it is to be considered that the mass of the stored goods can amount up to 20 tons.

It is understood that a folding of the chain is most undesirable under the explained circumstances because the total length of the chain is suddenly changed by this folding; in an extreme case, this can result in a rupture of the strap and in a damage of the deflections. Moreover, by a folding of the chain, a distance between the goods, that possibly has to be observed for the protection of the stored goods, can be changed. Also, it can happen that particularly light weight goods are raised and rotated out of the horizontal position upon a folding of the chain.

A folding cannot be avoided when conventional chains are used because the total length of the chains and the circulating conveying means, respectively, can vary to a large extent due to for instance temperature changes and expansion of the strap.

OBJECTS OF THE INVENTION

Thus, it is the object of the invention to improve a chain conveyor of the kind referred to above such that the chain can also take and transmit thrust forces.

A further object of the invention consists in providing a chain conveyor that is designed with means for laterally guiding the roller chain, which are simply arranged and can be manufactured at low costs, whereby the guide means shall present very low frictional resistances between roller chain and support rail.

SUMMARY OF THE INVENTION

To meet this and other objects, the present invention provides a chain conveyor comprising a roller chain and a supporting rail for vertically supporting the roller chain. The roller chain comprises a plurality of supporting rollers which are interconnected by means of chain links. The chain links are provided with stop means that limit the mutual rotating movement of adjacent chain links exceeding a predetermined angle such that the roller chain can transmit thrust forces.

By providing chain links which have stop elements that limit a mutual rotation of adjacent chain links exceeding a certain angle of rotation in such a way that the roller chain can transmit thrust forces, the danger that particular portions of the chain are folded together is eliminated and the disadvantages connected thereto are avoided.

The chain links of the roller chain are interconnected by means of a hollow shaft member. The shaft member is designed simultaneously as a supporting axle for the supporting rollers. A discrete guiding element is inserted into the shaft member. The guiding element that towers below the chain link at least at one side toward the guiding rail.

BRIEF DESCRIPTION OF THE DRAWINGS

FIG. 11 shows a top view of a portion of a roller chain equipped with chain links according to FIGS. 1 to 3;

FIG. 12 shows a portion of the roller chain according to FIG. 11 in a side view.

DETAILED DESCRIPTION OF A PREFERRED EMBODIMENT

Figure 1:
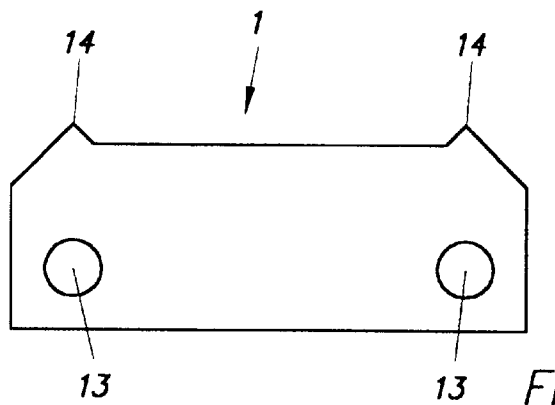
FIGS. 1 to 3 show an individual chain link for a roller chain in three different views.
Figure 2:
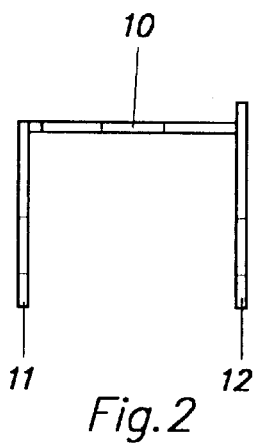
Figure 3:
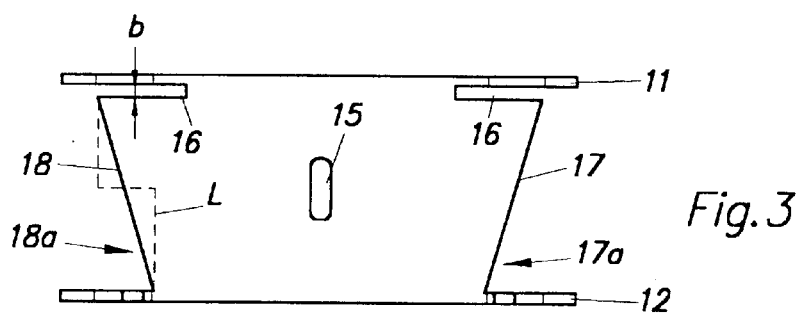

The FIGS. 1 to 3 show a chain link 1 for a roller chain in a side elevation, a front elevation and a top elevation. The chain link 1 is designed essentially U-shaped and comprises a base portion 10 as well as two legs 11, 12. The base portion situated between the two legs 11, 12 constitutes the top cover of the chain link 1. Both legs 11, 12 of the chain link 1 are provided with bores 13 which serve for receiving in each case a shaft for interconnecting the chain links 1 and for bearing and supporting a support roller.

The base portion 10 of the chain link 1 is provided with two recesses 16 arranged along one of the legs 11 and having a width b that is greater than the wall thickness of a leg 11, 12. By providing these recesses 16, the assembling of several uniformly designed chain links 1 to a chain is favored inasmuch as one leg 11, 12 of a preceding or subsequent chain link 1, in each case rotated by 180° around the height axis, which extends vertically through the center of base portion of each chain link engages such a recess 16.

Moreover, the base portion 10 is provided with a slot 15 running crosswise to its longitudinal axis. This slot serves for receiving a catch member made of an elastic material, as will be further explained herein below with the help of FIGS. 7 to 9.

The basic shape of such a chain link 1 is manufactured preferably by punching, while the U-shaped design is created by a subsequent bending of the punched out part.

The two end portions 17, 18 of the base portion 10 of a chain link 1 are preferably of oblique shape. On the other hand, the two end portions of the base portion can be provided with a stepping, as outlined by the broken lines L.

The one leg 12 is provided with two projections 14 towering above the top side of the base portion 10, whereby, due to manufacturing reasons, in each case the leg 12 adjacent to the shorter portion 17a, 18a of the base portion 10 comprises such projections 14.

Figure 4:
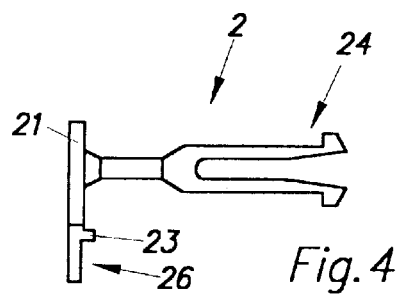
FIGS. 4 to 6 show a guiding element for the roller chain in three different views.
Figure 5:
Figure 6:
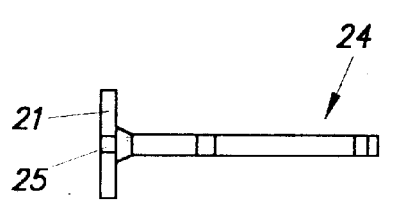

In the FIGS. 4 to 6, a guiding element 2 for the roller chain is shown in three different views. This guiding element 2 essentially consists of a guiding plate 21 as well as of a clamping part 24. Integrally formed at the inner side of the guiding plate 21, there is provided a strip member 23. The lower portion 26 of the guiding plate 21 serves for laterally guiding the roller chain, while the guiding plate comprises a rest surface provided at its top side and is designed to support the lower chain run of a circulating chain. The mode of operation of this guiding plate 21 will be further explained herein below with the help of FIG. 10.

Figure 7:
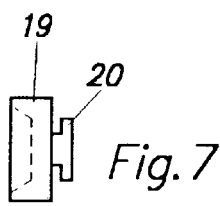
FIGS. 7 to 9 show a catch member for the roller chain in three different views.
Figure 8:
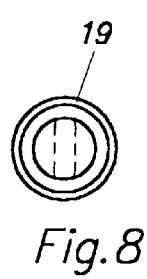
Figure 9:
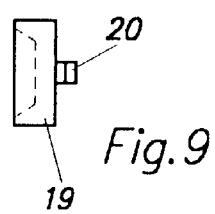

The FIGS. 7 to 9 show the catch member 19 in a side elevation, a front elevation and a top elevation. The catch member 19, preferably manufactured of rubber, serves as a rest for goods to be supported by the chain links. For fixing it in the slot machined into the base portion of the chain link, the catch member 19 comprises a holding portion 20 which is correspondingly designed to engage the slot. For fixing, the catch member 19 in the slot 15 the holding portion 20 is slid through the slot and, thereafter, the catch member is rotated by 90°. The catch member 19 preferably slightly towers above the projections of the chain link such that light goods do not rest on the projections, but on the catch member. However, by the elastic design of the catch member 19, it is ensured that heavy goods compress the catch member and, thereby rest against the projections, whereby a safe, non-positive connection between chain link and goods to be stored or the pallet upon which the goods are stored is ensured.

Figure 10:
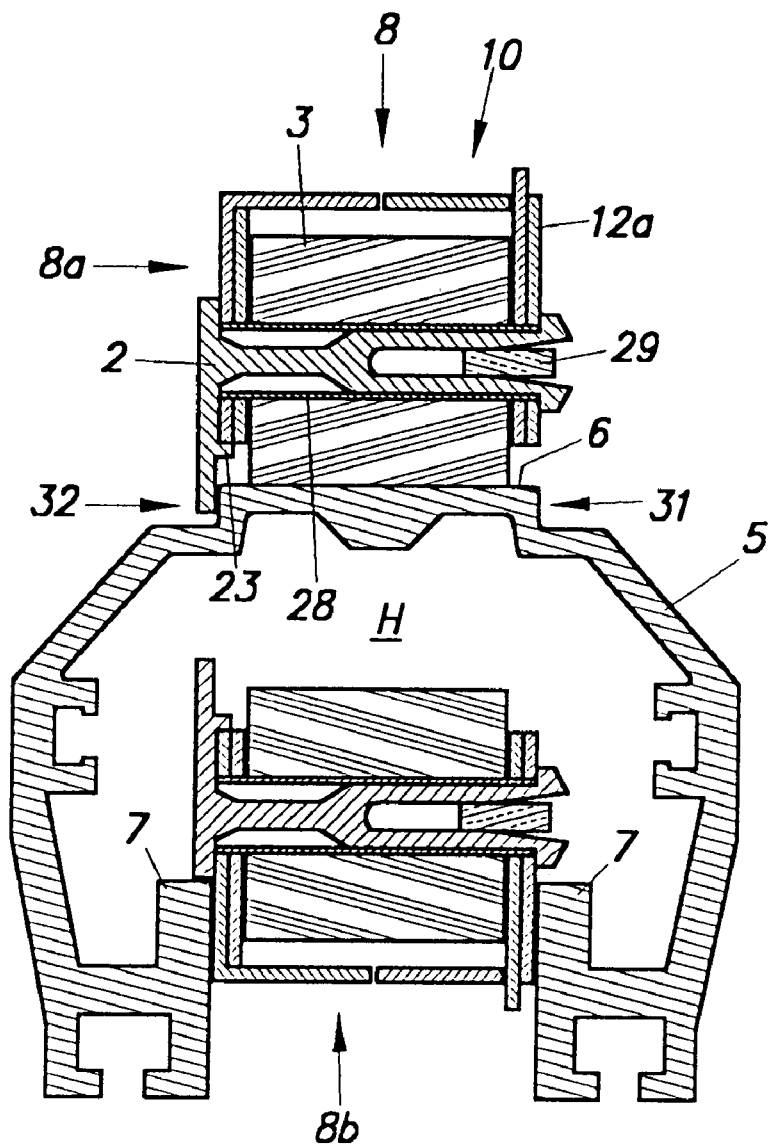
FIG. 10 shows a cross section through a support rail as well as through the roller chain.

FIG. 10 shows a cross section through a support rail 5 as well as a roller chain 8. The support rail 5 comprises, at its top side, a track surface 6 projecting upwards that is laterally defined by two guide faces 31, 32. At the bottom side, the support rail 5 is provided with a hollow chamber H having an open bottom in which are provided two auxiliary rails 7 on which the guiding plates 21 of the guiding elements 2 rest with their rest surfaces 25 and on which the lower run 8b of the chain is vertically supported.

The roller chain 8 is constituted by a plurality of chain links 1 designed according to FIGS. 1 to 3 and by supporting rollers 3, whereby in each case two chain links are interconnected by a shaft 28 in an articulated manner. The shafts 28 simultaneously serve for bearing the supporting rollers 3. Into the particular shaft 28, a guiding element 2 is inserted which towers below the chain link 1 at one side. At the other side, the clamping part 24 of the guiding element 2 engages the leg 12a whereby both the shaft 28 as well as the guiding element 2 can be fixed in the position shown here. Additionally, for securing the guiding element 2, a safety pin 29 can be provided, as illustrated, which is anchored in a self-locking manner. In order to form a chain of uniform chain links 1, these are arranged alternately rotated by 180° around their height axis, whereby the one chain link is offset with regard to the other chain link, as seen in longitudinal direction of the roller chain, by an amount corresponding to the wall thickness of a leg of a chain link. Besides the chain links 1, also the guiding elements 2 are arranged alternately rotated by 180°; this means, in other words, the guiding elements 2 are inserted into the particular shaft 28 alternately once from the left side and once from the right side, such that the roller chain 8 is guided on both sides of the track surface 6. The strip member 23 of the guiding element 2 extends along the bottom side of the particular leg of a chain link and prevents the guiding element 2 from being rotated, whereby the length of the strip member 23 approximately corresponds to the wall thickness of a leg of a chain link. It is to add that the roller chain 8 constitutes only approximately 60% of the circulating conveying means, while the remaining 40% consist of a strap that is fixed to the two ends of the chain.

FIG. 11 shows a top view of a portion of a roller chain that is provided with uniform chain links 1 according to FIGS. 1 to 3 as well as with guiding elements 2 according to FIGS. 4 to 6. It can be seen from this illustration that the chain links 1a, 1b, 1c, 1d are arranged alternately rotated around the height axis by 180° and that the one chain link is offset with regard to the other chain link 1a, 1b, 1c 1d, as seen in the longitudinal direction of the roller chain 8, by an amount of the wall thickness of the leg of a chain link 1a, 1b, 1c, 1d, such that in each case the one leg 11, 12 of a chain link engages the recess 16 (FIG. 3) in the base portion of the adjacent chain link. This design allows that the chain links 1a, 1b, 1c, 1d, also can take up and transmit lateral forces.

Moreover, it is evident that the mean length L of the base portion 10 at least approximately corresponds to the distance A of the axes of two adjacent supporting rollers 3. The base portion 10 preferably is shorter than the distance of the axes of two adjacent supporting rollers by approximately 0.5 to 3 mm, such that, the chain being in its stretched state, also creates a gap b2 in the order of 0.5 to 3 mm between the front faces of adjacent base portions 10b, 10c of adjacent chain links 1b, 1c. This design has the effect that the mutual rotational movement of adjacent chain links with respect to one another, exceeding a certain angle of rotation, is limited due to the fact that the front faces of adjacent base portions abut against each other turning back the chain links. In this connection, it is important that the front faces of adjacent base portions of adjacent chain links are designed to correspond with one another. A roller link designed in such a way, thus, can transmit thrust forces, without the danger that the chain folds together at certain portions.

FIG. 12 shows the portion of the roller chain according to FIG. 11 in a side view. In this illustration, the alternatingly arranged guiding elements 2 can be seen towering below the chain links.

A chain conveyor designed in such a way is of very simple construction and can be manufactured at low costs, because both the chain links as well as the guiding elements are of uniform design. By the provision of stop members limiting the mutual rotating movement of adjacent chain links exceeding a predetermined angle in the above explained manner, the roller chain can also transmit thrust forces.

What is claimed is:

1. A conveyor mechanism for use in rack storage facilities, the conveyor mechanism supporting articles placed thereon and moving when the articles on the conveyor mechanism are pushed by a thrust force, said conveyor mechanism comprising:
   a plurality of chain links, each having a surface on which an article may be placed,
   adjacent chain links being interconnected to move together,
   rollers being connected with said chain links and being movable with said chain links, and
   a supporting rail for vertically supporting said rollers and said chain links, said rollers moving along said rail when said chain links move,
   each of said chain links having a stop element which engages a stop element on an adjacent chain link to limit mutual rotating movement of the adjacent chain links so that the thrust force applied on the article is transmitted from a chain link supporting the article to the other chain links and to said rollers so that said chain links and said rollers move along said rail;
   each of said chain links being U-shaped, the U-shape including two legs and a base portion located between said two legs, the mean length of the base portion at least approximately equaling the distance between axles of two adjacent rollers, and adjacent faces of the base portions of adjacent chain links being of complementary design and acting as said stop elements.

2. The conveyor mechanism as in claim 1 wherein a gap of less than 5% of the length of a chain link exists between said front faces of adjacent chain links when said conveyor mechanism is in a stretched state.

3. The conveyor mechanism as in claim 1 wherein said base portion of said chain links is an upper cover for said conveyor mechanism and protects said rollers and said rail from contamination.

4. The conveyor mechanism as in claim 1 wherein two end portions of said base portion of a chain link comprises a stepping design.

5. The conveyor mechanism as in claim 1 wherein two end portions of said base portion of a chain link comprises an oblique design.

6. The conveyor mechanism as in claim 1 wherein a leg adjacent a shorter portion of said base portion includes a projection that extends above said base portion.

7. The conveyor mechanism as in claim 1 wherein said base portion includes two recesses arranged along one leg and having a width that is greater than a wall thickness of a corresponding leg on an adjacent chain link.

8. The conveyor mechanism as in claim 1 wherein adjacent chain links of said conveyor mechanism are alternately rotated about their height axis 180 degrees and whereby adjacent chain links are offset along a longitudinal direction by a distance equal to a thickness of a wall of a leg of a chain link.

9. The conveyor mechanism as in claim 1 wherein said chain links are interconnected by means of a shaft designed as a supporting axle for the supporting rollers.

10. The conveyor mechanism as in claim 1 wherein said base portion is provided with a slot running transverse to a direction of movement of said conveyor mechanism.

11. The conveyor mechanism as in claim 10 wherein a catch member having a holding portion is insertable into said slot in said base portion of said chain link and upon a rotation of 90 degrees becomes fixed to said base portion.

12. A conveyor mechanism for use in rack storage facilities, the conveyor mechanism supporting articles placed thereon and moving when the articles on the conveyor mechanism are pushed by a thrust force, said conveyor mechanism comprising:
   a plurality of chain links, each having a surface on which an article may be placed, adjacent chain links being interconnected to move together,
   rollers being connected with said chain links and being movable with said chain links,
   a supporting rail for vertically supporting said rollers and said chain links, said rollers moving along said rail when said chain links move,
   each of said chain links having a stop element which engages a stop element on an adjacent chain link to limit mutual rotating movement of the adjacent chain links so that the thrust force applied on the article is transmitted from a chain link supporting the article to the other chain links and to said rollers so that said chain links and said rollers move along said rail;
   said chain links being interconnected by means of a shaft designed as a supporting axle for the supporting rollers; and
   a discrete guiding element being insertable into said shaft, said guiding element having a guide plate that towers below the chain at least at one side toward said rail.

13. The conveyor mechanism as in claim 12 wherein said guiding element is provided with a strip member, said strip member being directed toward a chain link and extending along a lower side of a leg of said chain link, a length of said strip member corresponding to a maximum thickness of a wall of a leg of said chain link.

14. The conveyor mechanism as in claim 12 wherein said rail comprises a track surface at a top side of said rail, said track surface being laterally defined by two guiding faces.

15. The conveyor mechanism as in claim 14 wherein each guiding element includes at least one guiding member which is adapted to cooperate with said guiding faces.

16. The conveyor mechanism as in claim 14 wherein said guiding elements are made of a plastic material having self-lubricating properties.

* * * * *